(12) United States Patent
Lee et al.

(10) Patent No.: US 7,607,349 B2
(45) Date of Patent: Oct. 27, 2009

(54) ANGULAR VELOCITY SENSOR STRUCTURE

(75) Inventors: Sang Chul Lee, Seoul (KR); Sung Wook Kim, Seoul (KR)

(73) Assignee: SML Electronics, Inc., Seoul (KR)

( * ) Notice: Subject to any disclaimer, the term of this patent is extended or adjusted under 35 U.S.C. 154(b) by 0 days.

(21) Appl. No.: 11/854,871

(22) Filed: Sep. 13, 2007

(65) Prior Publication Data
US 2008/0053225 A1    Mar. 6, 2008

(30) Foreign Application Priority Data
Aug. 31, 2006    (KR) .................... 10-2006-0083406

(51) Int. Cl.
*G01P 15/00* (2006.01)
(52) U.S. Cl. .............. 73/488; 73/507; 73/510
(58) Field of Classification Search .......... 73/488, 73/504.12, 1.37, 1.38, 493, 504.02, 504.03, 73/507, 510
See application file for complete search history.

(56) References Cited

U.S. PATENT DOCUMENTS

| 5,933,795 A * | 8/1999 | Schottler et al. ............ 702/145 |
| 6,386,033 B1 * | 5/2002 | Negoro .................... 73/504.12 |
| 7,284,408 B2 * | 10/2007 | Kato ........................ 73/1.37 |
| 7,461,552 B2 * | 12/2008 | Acar ....................... 73/504.04 |
| 2003/0009308 A1 * | 1/2003 | Kirtley ..................... 702/141 |
| 2006/0184301 A1 * | 8/2006 | Konno et al. ................. 701/45 |
| 2006/0250504 A1 * | 11/2006 | Seo ....................... 348/208.11 |

OTHER PUBLICATIONS

Translation of JP 1994324066.*

* cited by examiner

*Primary Examiner*—Hezron Williams
*Assistant Examiner*—Samir M Shah
(74) *Attorney, Agent, or Firm*—Ohlandt, Greeley, Ruggiero & Perle, LLP

(57) ABSTRACT

An angular velocity sensor structure for improving the off-axis sensitivity is provided in which a structure for detecting an off-axis acceleration component applied to the angular velocity sensor structure is directly adapted to the sensor structure, thereby measuring the off-axis acceleration component actually applied to the sensor structure without distortion.

4 Claims, 2 Drawing Sheets

ANGULAR VELOCITY SENSOR STRUCTURE

BACKGROUND OF THE INVENTION

1. Field of the Invention

The present invention relates to an angular velocity sensor structure, and more particularly to an angular velocity sensor structure which minimizes off-axis sensitivity of an angular velocity sensor to improve the performance of the angular velocity sensor.

Herein, the off-axis sensitivity means the sensitivity by 2-axis components other than an axis component to be needed among 3-axis components (x, y, and z components) of acceleration in vector quantity. For example, if a y-axis component is needed, the off-axis sensitivity comes to the sensitivity by the other x and y-axis components.

2. Description of Related Art

For improvement in performance of an angular velocity sensor, it is very important to eliminate the off-axis sensitivity, i.e. an acceleration component applied in a direction of off-axis. However, it is difficult, in a conventional micro angular velocity sensor having a capacitive sensing structure, to eliminate an acceleration component applied in a direction of off-axis.

As a conventional method for eliminating the off-axis sensitivity, there have been the methods with which the off-axis sensitivity is taken into consideration upon structural-designing of a sensor, upon signal-processing of a sensor using a circuit system, and others.

An acceleration sensor part can be used to measure an acceleration component in a direction of off-axis that is applied in a direction of off-axis to have influence upon the performance of angular velocity. However, this case may cause a problem in that it is impossible to accurately measure the degree of distortion by acceleration applied to an acceleration sensor in a direction of off-axis.

Another method is the case where an acceleration sensor and an angular velocity sensor are provided in a single board. However, in case of vacuum-packaged angular velocity sensor, it is difficult to adapt such a method thereto. It is because if the acceleration sensor provided is a capacitive type, a vacuum-packaging and an atmospheric-packaging are hardly realized at the same time on the same board, and if it is a resonant type, area efficiency is low to increase manufacturing costs.

Therefore, in order to solve above problems, technology is needed which measures the magnitude of acceleration applied to an angular velocity sensor structure in a direction of off-axis and eliminates the same to thereby minimize the off-axis sensitivity of an angular velocity sensor.

SUMMARY OF THE INVENTION

The present invention has been made to solve the problems of the above-mentioned prior technology, and an object of the present invention is to integrate an acceleration sensor structure with an angular velocity sensor structure to measure an actual distortion of an angular velocity detecting signal due to an acceleration component in a direction of an off-axis and eliminate the measured distortion from the angular velocity signal to minimize the off-axis sensitivity of the angular velocity sensor, thereby improving the performance of the angular velocity sensor.

Another object of the present invention is to integrate an acceleration sensor structure with an angular velocity sensor structure to minimize a change in sensor size.

In order to accomplish above and other objects, according to an aspect of the present invention, there is provided a structure in which an acceleration sensor structure is integrated with an angular velocity sensor structure. The angular velocity sensor structure according to an embodiment of the present invention includes an angular velocity detecting unit, an off-axis acceleration detecting unit, and a driving unit for driving the same, the detecting units being integrated together on the same board.

According to the technology proposed by the present invention, it can measure off-axis acceleration actually applied to the angular velocity sensor structure, and eliminate an off-axis acceleration component included in a signal of the angular velocity sensor.

Further, according to the technology proposed by the present invention, it can minimize the off-axis sensitivity from the performance index of the angular velocity sensor.

Furthermore, the structure of the present invention can be easily designed because it uses the conventional structure designing technology.

DETAILED DESCRIPTION OF THE INVENTION

Description on an angular velocity sensor structure of which off-axis sensitivity is minimized will now be made of preferred embodiments of the present invention with reference to accompanying drawings.

Figure 1:
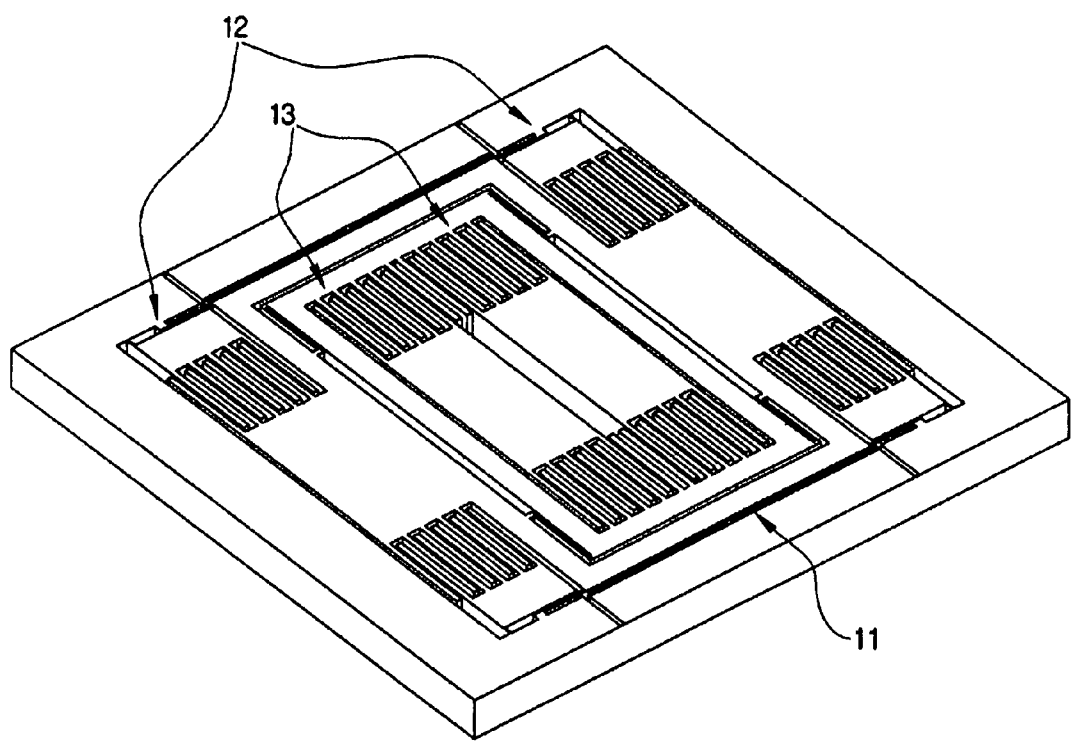
FIG. 1 is a schematic view illustrating an angular velocity sensor structure according to an embodiment of the present invention.

FIG. 1 is a schematic view of an angular velocity sensor structure that is realized as an embodiment of the present invention according to the technology for improving the sensitivity of an angular velocity sensor. In the drawing, a structure is illustrated in which an off-axis acceleration detecting unit 12 is integrated with an angular velocity detecting unit 13. Further, it is also illustrated well how the angular velocity detecting unit 13, the off-axis acceleration unit 12, and a driving unit 11 for an angular velocity sensor are arranged in connection with each other on the same board.

Figure 2:
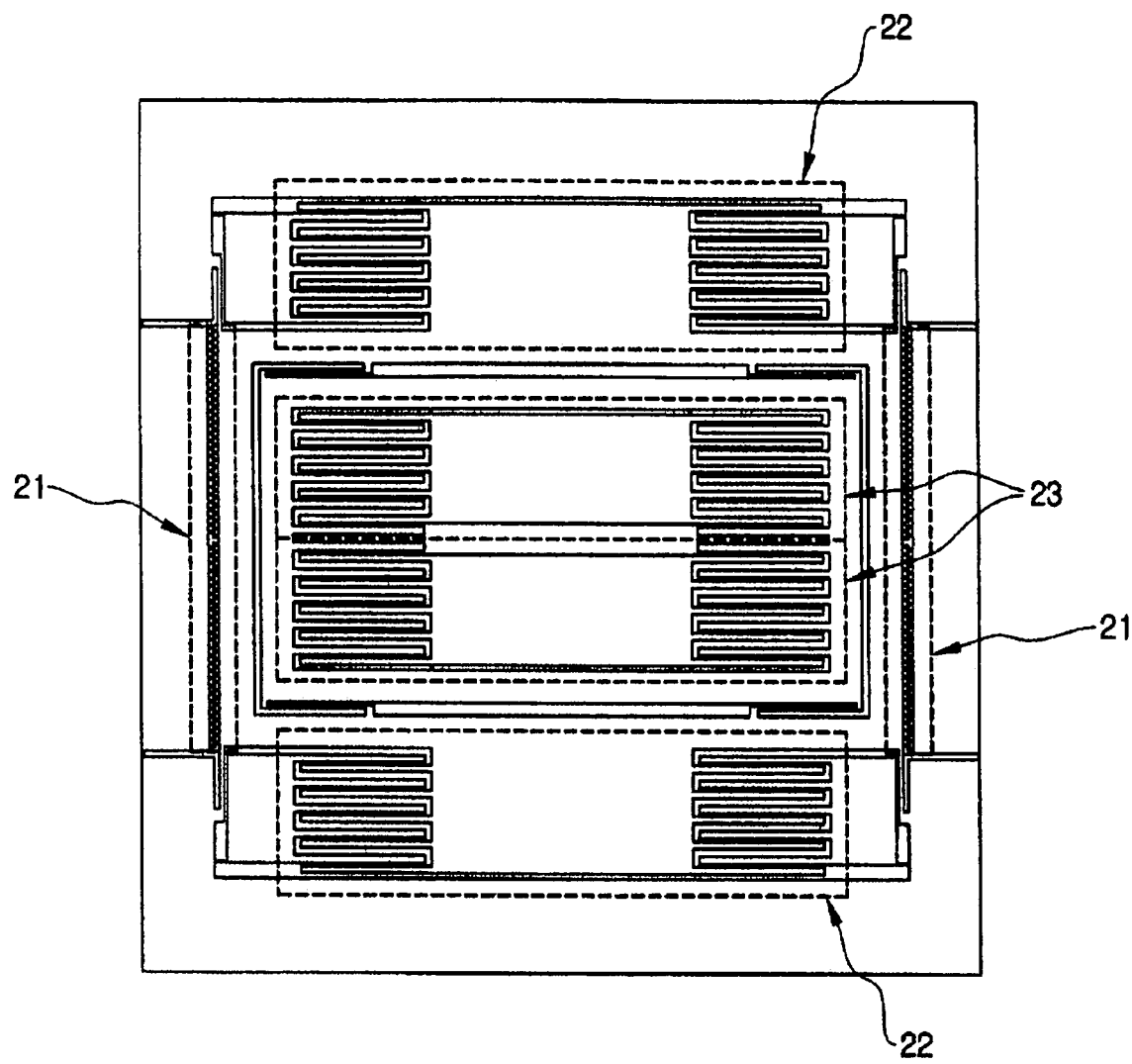
FIG. 2 is a constructional view illustrating the angular velocity sensor structure according to an embodiment of the present invention.

FIG. 2 illustrates the angular velocity sensor structure of FIG. 1 more specifically, which shows a structure having an off-axis acceleration detecting unit 22 integrated with an angular velocity detecting unit 23.

In FIG. 2, the angular velocity sensor structure according to an embodiment of the present invention is constructed such that the angular velocity detecting unit 23 and the off-axis acceleration detecting unit 22 are arranged on the same board, and a driving unit 21 for an angular velocity sensor is also disposed together. That is, the angular velocity sensor structure includes the angular velocity detecting unit 23 formed in a board, the driving unit 21 for the angular velocity sensor for driving the angular velocity detecting unit 23, and the off-axis acceleration detecting unit 22 provided on the same board as the angular velocity detecting unit 23 and driven by the driving unit 21 for the angular velocity sensor for detecting the off-axis acceleration by the motion of the driving unit.

As described above, the angular velocity sensor structure is provided such that two angular velocity detecting units 13 and 23 are arranged, at one sides, oppositely on the board, the off-axis acceleration detecting units 12 and 22 are arranged adjacent to the other sides of the angular velocity detecting units, and the driving units 11 and 21 for driving the angular velocity detecting units 13 and 23 and the off-axis acceleration detecting units 12 and 22 are also disposed together, thereby forming the angular velocity sensor. Thus, if such a construction is used, a fine motion of the driving units 11 and 21 for the angular velocity sensor is detected by the off-axis acceleration detecting units 12 and 22, and the off-axis sensitivity is corrected using the detected value, thereby eliminating an error that may occur due to the driving units 11 and 21 for the angular velocity sensor. In other words, the off-axis sensitivity of the angular velocity sensor is reduced using the effective arrangement of the angular velocity sensor structure thus to improve the performance of the angular velocity sensor.

Specifically, according to an embodiment of the present invention, it can be known that the angular velocity sensor structure is a structure in which the driving units 11 and 21 for the angular velocity sensor, the off-axis acceleration detecting units 12 and 22, and the angular velocity detecting units 13 and 23 are arranged as illustrated in FIGS. 1 and 2. In this case, the angular velocity sensor structure as illustrated in FIG. 2 is constructed such that the angular velocity detecting unit 23 and the off-axis acceleration detecting unit 22 have the same capacitance and structure. However, even when the capacitance and the structure are different, the difference can be adjusted in consideration of a numerical difference thereof upon correcting the off-axis sensitivity, so that the effect is identical to that of the case where the angular velocity detecting unit 23 and the off-axis acceleration detecting unit 22 have the same capacitance and structure.

From the above, the angular velocity sensor structure is provided such that the angular velocity detecting units 13 and 23 and the off-axis acceleration detecting units 12 and 22 are arranged together on the same single board, that is, the angular velocity sensor structure is formed in the angular velocity sensor with a single packaging, thereby minimizing the off-axis sensitivity and therefore improving the performance of the angular velocity sensor.

Although an exemplary embodiment of the present invention has been described for illustrative purposes, those skilled in the art will appreciate that various modifications, additions and substitutions are possible, without departing from the scope and spirit of the invention as disclosed in the accompanying claims.

INDUSTRIAL APPLICABILITY

The angular velocity sensor structure of the present invention minimizes the off-axis sensitivity of the angular velocity sensor thereby to improve the performance of the angular velocity sensor.

The invention claimed is:
1. An angular velocity sensor structure comprising:
a driving unit movably formed on a board;
an angular velocity detecting unit formed on the board that detects angular velocity by the motion of the driving unit; and
an off-axis acceleration detecting unit formed on the same board as the angular velocity detecting unit that detects off-axis acceleration by the motion of the driving unit
wherein the angular velocity detected by the angular velocity detecting unit is corrected using the off-axis acceleration detected by the off-axis acceleration detecting unit.
2. The angular velocity sensor structure according to claim 1, wherein the angular velocity detecting unit and the off-axis acceleration detecting unit have the same capacitance.
3. The angular velocity sensor structure according to claim 1, wherein the angular velocity detecting unit and the off-axis acceleration detecting unit have the same structure.
4. The angular velocity sensor structure according to claim 1, wherein the angular velocity detecting unit and the off-axis acceleration detecting unit have the same capacitance and structure.

* * * * *